United States Patent
Satterlee et al.

(10) Patent No.: US 7,849,505 B2
(45) Date of Patent: Dec. 7, 2010

(54) SYSTEM AND METHOD OF SELECTING A VIRTUAL PRIVATE NETWORK ACCESS SERVER

(75) Inventors: Michael Satterlee, Clifton, NY (US); Stephen Matthew Hutnik, Hawthorne, NY (US)

(73) Assignee: AT&T Intellectual Property I, LP, Reno, NV (US)

( * ) Notice: Subject to any disclaimer, the term of this patent is extended or adjusted under 35 U.S.C. 154(b) by 972 days.

(21) Appl. No.: 11/506,210

(22) Filed: Aug. 17, 2006

(65) Prior Publication Data

US 2008/0046995 A1  Feb. 21, 2008

(51) Int. Cl.
G06F 9/00 (2006.01)
H04L 29/06 (2006.01)

(52) U.S. Cl. .......................... 726/15; 713/135; 726/11

(58) Field of Classification Search .................. 726/15, 726/11; 713/135
See application file for complete search history.

(56) References Cited

U.S. PATENT DOCUMENTS

| | | | | |
|---|---|---|---|---|
| 6,944,664 | B1 * | 9/2005 | Chantrain et al. | 709/227 |
| 7,376,743 | B1 * | 5/2008 | Bazzinotti et al. | 709/229 |
| 2002/0002687 | A1 * | 1/2002 | Chantrain et al. | 713/201 |
| 2002/0144143 | A1 * | 10/2002 | Chang et al. | 713/201 |
| 2003/0041238 | A1 * | 2/2003 | French et al. | 713/153 |
| 2003/0097564 | A1 * | 5/2003 | Tewari et al. | 713/171 |
| 2004/0083295 | A1 * | 4/2004 | Amara et al. | 709/229 |
| 2004/0174876 | A1 * | 9/2004 | Peirce et al. | 370/389 |
| 2005/0089015 | A1 * | 4/2005 | Tsuge et al. | 370/351 |
| 2006/0041939 | A1 * | 2/2006 | Schwartzman et al. | 726/15 |
| 2007/0299954 | A1 * | 12/2007 | Fatula | 709/223 |
| 2008/0034416 | A1 * | 2/2008 | Kumar et al. | 726/15 |
| 2008/0034418 | A1 * | 2/2008 | Venkatraman et al. | 726/15 |
| 2008/0034419 | A1 * | 2/2008 | Mullick et al. | 726/15 |

* cited by examiner

*Primary Examiner*—Techane J Gergiso
(74) *Attorney, Agent, or Firm*—Toler Law Group

(57) ABSTRACT

The present disclosure is directed to a system and method of selecting a virtual private network access server. In a particular embodiment, the method includes receiving a request from a client device to access a network resource via a virtual private network (VPN). The method also includes sending operational data related to each of a plurality of VPN access servers to the client device. The method also includes receiving a selection of one of the plurality of VPN access servers from the client device and communicatively connecting the client device with the selected one of the VPN access servers.

27 Claims, 6 Drawing Sheets

SYSTEM AND METHOD OF SELECTING A VIRTUAL PRIVATE NETWORK ACCESS SERVER

FIELD OF THE DISCLOSURE

The present disclosure relates generally to selecting a virtual private network access server.

BACKGROUND

Remote communication can be valuable to many companies, because it can enable employees who are off-site to continue their work. Public connections to resources on a company's private network are typically not secure. Thus, many companies provide secure access to resources on a private network via the Internet or other public communication infrastructure, through virtual private network (VPN) connections. VPN connections typically involve communication between a client device and a VPN access server that communicates with the intended network resource, using a tunneling protocol that does not allow transmission of data that is not properly encrypted.

Characteristics of VPN access servers can limit the utility of VPN connections to network resources. For example, traffic on a VPN access server can hinder data, voice or video transmissions between a client device and a target network resource. Nonetheless, users typically cannot tell whether a VPN access server can support or is desirable for VPN communication with a network resource, until a problem occurs. Hence, there is a need for a system and method of selecting a virtual private network access server.

DETAILED DESCRIPTION OF THE DRAWINGS

Figure 1:
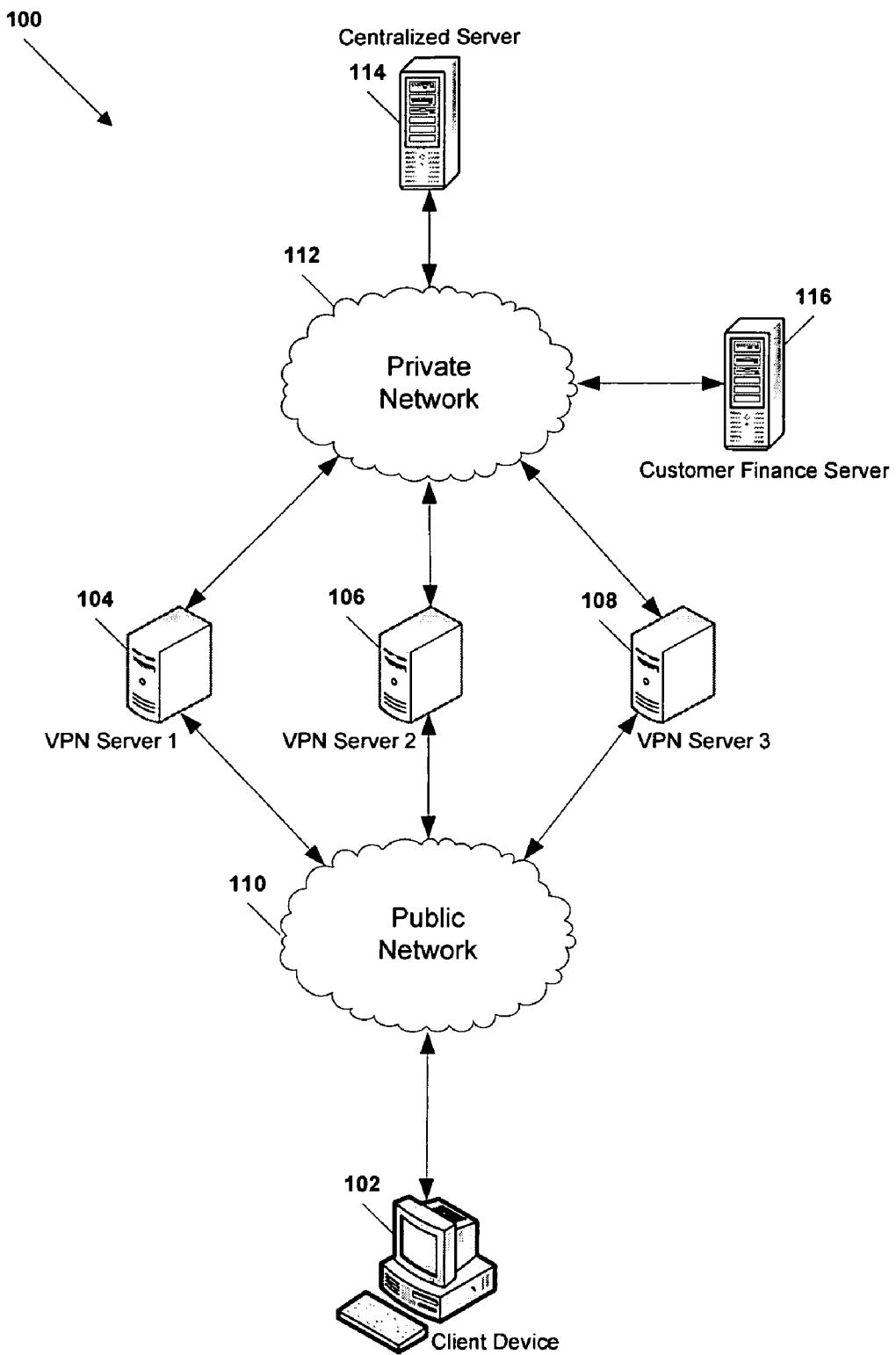
FIG. 1 is a block diagram of a particular illustrative embodiment of a system to select a virtual private network access server.

The present disclosure is directed to a system that includes a centralized server communicating with a private network, the centralized server having a processor and a memory device accessible to the processor. The memory device includes instructions to communicate with a client device to receive a request to access a network resource via a virtual private network (VPN), the network resource communicating with the private network. Further, the memory device includes instructions to send a list of a plurality of VPN access servers to the client device and to send operational data related to each of the plurality of VPN access servers to the client device. The memory device also includes instructions to communicate with the client device to receive a selection of one of the plurality of VPN access servers from the client device.

In another embodiment, the disclosure is directed to a system that includes a client device having a processor and a memory device accessible to the processor. The memory device includes instructions to communicate with a centralized server of a private network to request access to a network resource of the private network via a virtual private network (VPN). The memory device also includes instructions to communicate with the centralized server to receive a list of a plurality of VPN access servers and to receive operational data related to each of the plurality of VPN access servers In another embodiment, the disclosure is directed to a method of selecting a virtual private network access server that includes receiving a request from a client device to access a network resource via a virtual private network (VPN). The method also includes sending operational data related to each of a plurality of VPN access servers to the client device. The method also includes receiving a selection of one of the plurality of VPN access servers from the client device and communicatively connecting the client device with the selected one of the VPN access servers.

In another embodiment, the disclosure is directed to a method of selecting a virtual private network access server that includes sending a request to a centralized server to receive access to a network resource of a private network via a virtual private network (VPN). The method also includes receiving, from the centralized server, operational data related to each of a plurality of VPN access servers. Further, the method includes sending a selection of one of the plurality of VPN access servers to the centralized server.

In another embodiment, the disclosure is directed to a computer program embedded in a computer-readable medium. The computer program includes instructions to request access to a network resource of a private network via a virtual private network (VPN). The computer program also includes instructions to communicate with a centralized server of the private network to receive a list of a plurality of VPN access servers and to receive operational data related to each of the plurality of VPN access servers. The computer program also includes instructions to send a selection of one of the plurality of VPN access servers from the client device to the centralized server.

Referring to FIG. 1, an illustrative embodiment of a system to select a virtual private network access server is illustrated and is generally designated 100. The system includes a client device 102, such as a server, desktop, or portable computing device, that allows a user to establish communication with various resources via a virtual private network (VPN). In a particular embodiment, the client device 102 can communicate with a plurality of VPN access servers, such as a first VPN access server 104, a second VPN access server 106, or a third VPN access server 108. In an illustrative embodiment, the client device 102 can communicate with the plurality of VPN access servers 104-108, via a public network 110, such as the Internet.

As illustrated in FIG. 1, the VPN access servers 104-108 communicate with various network resources via a private network 112, such as a local area network (LAN) or intranet. The VPN access servers 104-108 facilitate communication between the client device 102 and the network resources. For example, the VPN access servers 104-108 can facilitate communication between the client device 102 and a centralized server 114 that controls VPN access to network resources communicating with the private network 112. In another example, the VPN access servers 104-108 can facilitate communication between the client device 102 and data servers, application servers, or other servers, such as a customer finance server 116.

In a particular embodiment, the centralized server 114 can collect data related to the functions of each of the VPN access servers 104-108. For example, the centralized server 114 can measure uptime of each VPN access server. Further, the centralized server 114 can measure a number of current users communicatively connected with each VPN access server. In another example, the centralized server 114 can measure a utilization of a central processing unit (CPU) of each VPN access server, such as a utilized proportion of a total capacity of a processor of the VPN access server. Further, the centralized server 114 can measure a reliability of each VPN access server, such as a percentage of dropped communications or data packet loss over a period of time. In addition, the centralized server 114 can measure an available bandwidth that the VPN access server has into the private network 112 for various classes of service, such as Voice-over Internet Protocol (VoIP), data, video, and other classes of service. In another example, the centralized server 114 can measure geographical information related to each VPN access server, the proximity of each VPN access server to the client device 102, or any combination thereof. Additionally, the centralized server 114 can measure latency in reaching upstream resources via the VPN access server, or jitter in reaching upstream resources via the VPN access server, or any combination thereof, for instance, in the facilitation of VoIP services.

The centralized server 114 can collect data related to each of the VPN access servers 104-108 at pre-determined time intervals, such that the data is periodically updated at the centralized server 114. In an illustrative embodiment, the centralized server 114 can measure data related to all of the VPN access servers 104-108 at the end of each time interval. Alternatively, the centralized server 114 can measure data related to a first subset of the VPN access servers 104-108 at the end of a first time interval, data related to a second subset of the VPN access servers 104-108 at the end of a second time interval, and so on. In a particular embodiment, the centralized server 114 can analyze the data and produce operational data, such as statistics, related to the functions of each of the VPN access servers 104-108.

In an illustrative embodiment, the client device 102 can run a remote access client application to establish VPN communication with one or more network resources communicating with the private network 112. For instance, the remote access client application can include instructions, logic, or any combination thereof, to cause the client device 102 to send to the centralized server 114 a request to establish VPN communication with network resources. Such a request can be received at one of the VPN access servers, such as the first VPN access server 104, via the public network 110. In a particular embodiment, the first VPN access server 104 can relay or otherwise send the request to the centralized server 114 via the private network 112, without allowing the client device 102 access to the private network 112 until the client device 102 or a user of the client device 102 is authenticated.

In an exemplary embodiment, the centralized server 114 can receive a request to establish a VPN connection from the client device 102 and can prompt the user via the remote access client application to input an authentication token, such as a password, user name, login identification, access code, other authentication token, or any combination thereof, at the client device 102. After the authentication token is received at the centralized server 114, the client device 102 can be granted VPN access to network resources communicating with the private network 112.

After the client device 102 is granted VPN access to network resources, the centralized server 114 can send to the client device 102 data related to identifications of a plurality of available VPN access servers 104-108 and to operational data associated with each of the VPN access servers 104-108. In an illustrative embodiment, the remote access client application can cause the client device 102 to display a list of available VPN access servers 104-108 with statistics related to functions of each VPN access server.

In a particular embodiment, the user can select one of the plurality of available VPN access servers 104-108 based on the operational data. For example, a user may wish to access the customer finance server 116 via a VPN access server that is geographically closest to the customer finance server 116. Operational data may indicate that the third VPN access server 108 is geographically closest to the customer finance server 116, and the user may select the third VPN access server 108. The remote access client application can cause the client device 102 to send a selection of a VPN access server, such as the third VPN access server 108, to the centralized server 114 via the first VPN access server 104. The centralized server 114 can communicatively connect the client device 102 with the third VPN access server 108, and the user can access network resources.

In another particular embodiment, a user can create and edit a profile at the client device 102 via the remote access client application. The profile can include criteria to determine a selection of an available VPN access server based on operational data related to a plurality of VPN access servers. For example, the profile can include criteria that indicate that CPU utilization related to a VPN access server must be equal to or less than a threshold value, that a number of users of a VPN access server must be equal to or less than a threshold value, that available bandwidth must be equal to or above a threshold value, other criteria to select a VPN access server, or any combination thereof. In an illustrative embodiment, the remote access client application can select a VPN access server based on the profile criteria and the operational data received from the centralized server 114. The remote access client can cause the client device 102 to send the selection to the centralized server 114, recommend a VPN access server to the user for selection, or any combination thereof.

Figure 5:
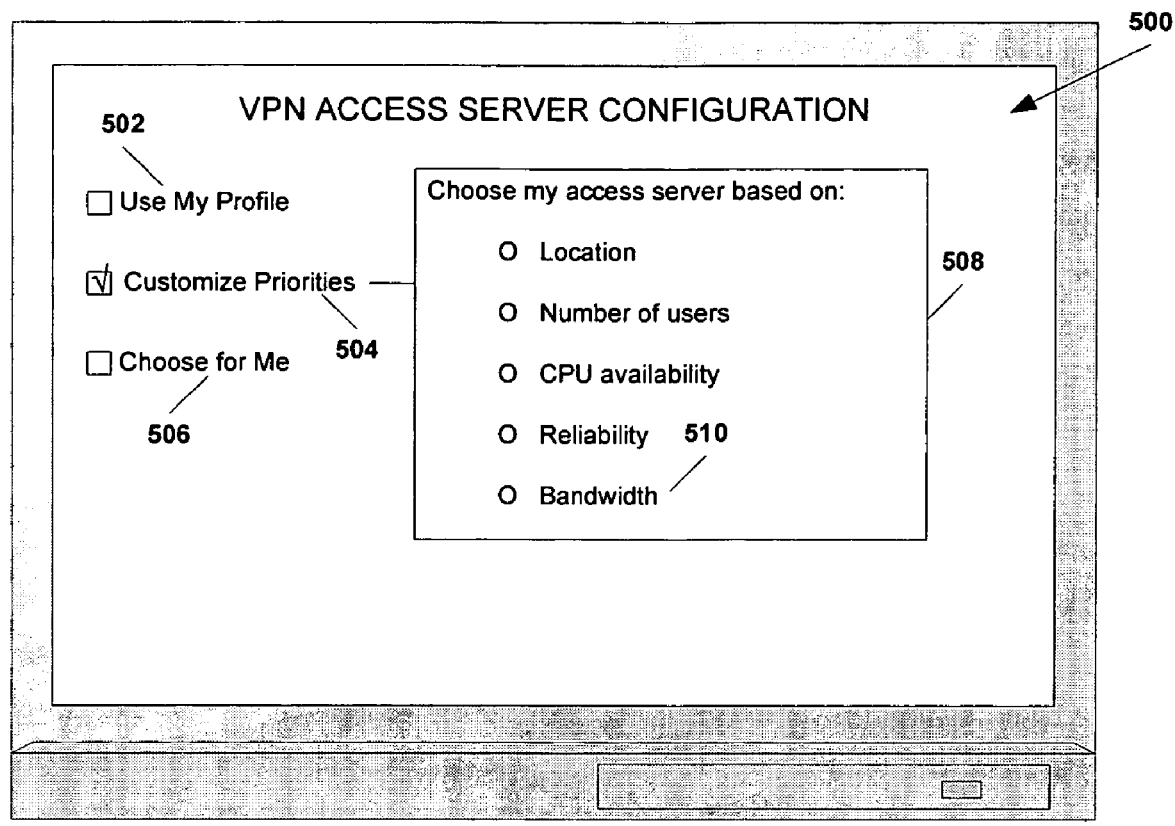
FIG. 5 is a diagram illustrating a particular illustrative embodiment of a graphical user interface to select a virtual private network access server.

In another illustrative embodiment, the remote access client application can cause the client device 102 to display a graphical user interface (GUI) that allows a user to select one or more criteria, priorities, or commands that are to be used by the remote access client to select one of the plurality of available VPN access servers 104-108 based on the corresponding operational data. For example, the GUI can display options to select a VPN access server according to a user profile, according to priorities designated by the user via the GUI, according to a network-level preference (e.g., evenly distributing users among the VPN access servers 104-108), or any combination thereof. The remote access client can select a VPN access server based on a user selection received via the GUI and the operational data received from the centralized server 114. The remote access client can cause the client device 102 to send the selection to the centralized server 114, recommend a VPN access server to the user for selection, or any combination thereof. An example of a GUI to select a manner in which a VPN access server is to be selected is illustrated in FIG. 5.

Figure 2:
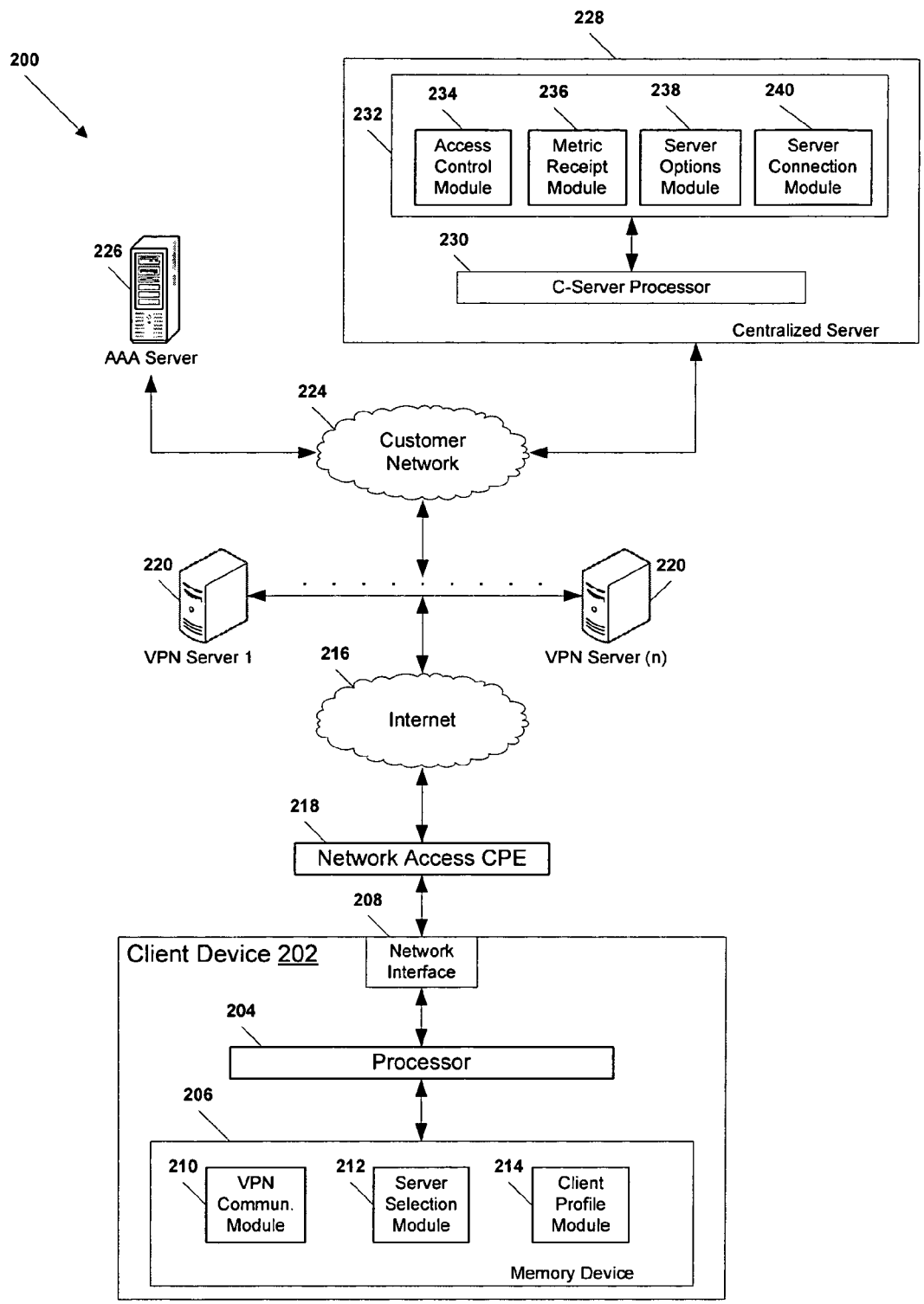
FIG. 2 is a block diagram of a second particular illustrative embodiment of a system to select a virtual private network access server.

Referring to FIG. 2, a second particular embodiment of a system to select a virtual private network access server is illustrated and designated generally at 200. The system 200 includes a client device 202, such as a server, desktop, or portable computing device. The system 200 also includes a plurality of VPN access servers (1 . . . n) 220 that communicate with the client device 202 via a public network, such as the Internet 216. Further, the system 200 includes various network resources that communicate with the plurality of VPN access servers 220 via a private network, such as a customer network 224. For example, the network resources can include an authentication-authorization-accounting (AAA) server 226 and a centralized server 228.

In a particular embodiment, the client device 202 can include a processor 204 and a memory device 206 that is accessible to the processor 204. Additionally, the client device 202 can include a network interface 208 to communicate with the Internet 216. In an illustrative embodiment, the client device 202 can be coupled to network access customer premise equipment (CPE) 218, such as a modem, router, switch or other CPE. In one embodiment, the CPE 218 can be a cable modem. In another embodiment, the CPE 218 can be a digital subscriber line (DSL) modem.

In a particular embodiment, the memory device 206 can include a VPN communication module 210 that is executable by the processor 204 to send a request to the centralized server 228 to establish communication with network resources via a virtual private network. In an illustrative embodiment, the VPN communication module 210 can send such a request to the centralized server 228 by communicating with one of the plurality of VPN access servers 220 via the Internet 216. Further, the VPN communication module 210 can be executable by the processor 204 to send and receive communications between the client device 202 and the plurality of VPN access servers 220, network resources communicating with the customer network 224, or any combination thereof, after the client device 202 is granted access to such network resources by the centralized server 228.

In a particular embodiment, the memory device 206 can include a server selection module 212 that is executable by the processor 204 to communicate with the centralized server 228 to receive data related to identifications of one or more of the plurality of VPN access servers 220 and operational data associated with each of the VPN access servers 220. In an illustrative embodiment, the server selection module 212 can be executable by the processor 204 to cause the client device 202 to display a user interface or other display that allows a user to select criteria, priorities or commands according to which one of the VPN servers 220 is to be selected.

For example, the server selection module 212 can be executable by the processor 204 to cause the client device 202 to display a list of the VPN servers 220 and operational data related to each of the VPN servers 220. Further, the server selection module 212 can be executable by the processor 204 to communicate with one or more input devices of the client device 202, such as a keyboard, mouse, stylus, microphone, or any combination thereof, to receive a user selection of one of the plurality of VPN access servers 220. The server selection module 212 can also be executable by the processor 204 to send the selection to the centralized server 228. The VPN communication module 210 can be executable by the processor 204 to establish communication with the selected VPN access server 220 and the network resources after the centralized server 228 communicatively connects the client device 202 with the selected VPN access server 220.

In another exemplary embodiment, the server selection module 212 can be executable by the processor 204 to cause the client device 202 to display a graphical user interface (GUI) that includes options to select a VPN access server 220 according to a user profile, according to priorities designated by the user via the GUI, according to a network-level preference (e.g., evenly distributing users among the VPN access servers 220), or any combination thereof. The server selection module 212 can be executable by the processor 204 to select or recommend a VPN access server 220 based on a user selection received via the GUI and the operational data received from the centralized server 228. Further, the server selection module 212 can be executable by the processor 204 to send the selection to the centralized server 228. An example of a GUI to select a manner in which a VPN access server is to be selected is illustrated in FIG. 5.

In a particular embodiment, the memory device 206 can include a client profile module 214 that is executable by the processor 204 to create and edit a user profile that is stored at the client device 202. The profile can include criteria to determine a selection of an available VPN access server 220 based on operational data related to a plurality of VPN access servers. For example, the profile can include criteria that indicate that CPU utilization related to a VPN access server 220 must be equal to or less than a threshold value, that a number of users of a VPN access server 220 must be equal to or less than a threshold value, that available bandwidth must be equal to or above a threshold value, other criteria to select a VPN access server 220, or any combination thereof.

In another embodiment, the profile module 214 can be executable by the processor 204 to create, edit and store multiple user profiles, where each profile includes criteria related to a particular class of service. For instance, a first user profile can include criteria for selecting a VPN access server 220 when a user is using a Voice-over Internet Protocol (VoIP) service, such as criteria that indicate that latency or jitter in reaching upstream resources must be equal to or less than a threshold value. A second user profile can include criteria for selecting a VPN access server when a user is using a video conferencing services, such as criteria that data packet loss must be equal to or less than a threshold value. In an illustrative embodiment, the profile module 214 can be executable by the processor to select a VPN access server based on profile criteria and operational data received from the centralized server 228 and to send the selection to the centralized server 228, recommend a VPN access server to the user for selection, or any combination thereof.

In an illustrative, non-limiting embodiment, the various modules 210-214 included within the memory device 206 can be instructions of a remote access client application running on the client device 202.

In a particular embodiment, the AAA server 226 can collect data related to the functions of each of the VPN access servers 220. The AAA server 226 can measure or otherwise collect various data related to each of the VPN access servers 220 at pre-determined time intervals. The AAA server 226 can send the collected data to the centralized server 228. In an illustrative embodiment, the centralized server 228 can analyze the data and produce operational data, such as statistics, based on the data that it receives from the AAA server 226. In another embodiment, the AAA server 226 can analyze the data and produce statistics related to the functions of each of the VPN access servers 220, based on the data.

In a particular embodiment, the centralized server 228 can include a C-server processor 230 and a C-server memory device 232 that is accessible to the C-server processor 230. The C-server memory device 232 can include an access control module 234 that is executable by the C-server processor 230 to receive a request form the client device 202 to establish communication with network resources via a virtual private network. In an illustrative embodiment, the access control module 234 can be executable by the C-server processor 230 to authenticate the client device 202 before granting access to network resources.

In a particular embodiment, the C-server memory device 232 can include a metric receipt module 236 that is executable by the C-server processor 230 to communicate with the AAA server 226 to receive data related to each of the VPN access servers 220. In one embodiment, the metric receipt module 236 can also be executable by the C-server processor 230 to communicate with the AAA server 226 to receive operational data produced from the data. In another embodiment, the metric receipt module 236 can be executable by the C-server processor 230 to analyze data related to each of the VPN access servers 220 and to produce operational data based on the data.

In a particular embodiment, the C-server memory device 232 can include a server options module 238 that is executable by the C-server processor 230 to send data related to identifications of each of the VPN access servers 220 to the client device 202. Further, the server options module 238 can be executable by the C-server processor 230 to send operational data related to each of the VPN access servers 220 to the client device 202. In addition, the server options module 238 can be executable by the C-server processor 230 to receive a selection of one of the VPN access servers 220 from the client device 202. The C-server memory device 232 can include a server connection module 240 that is executable by the C-server processor 230 to communicatively connect the client device 202 with a selected one of the VPN access servers 220.

In an illustrative embodiment, the various modules 210-214 and 234-240 can include logic, hardware, computer instructions, or any combination thereof.

Figure 3:
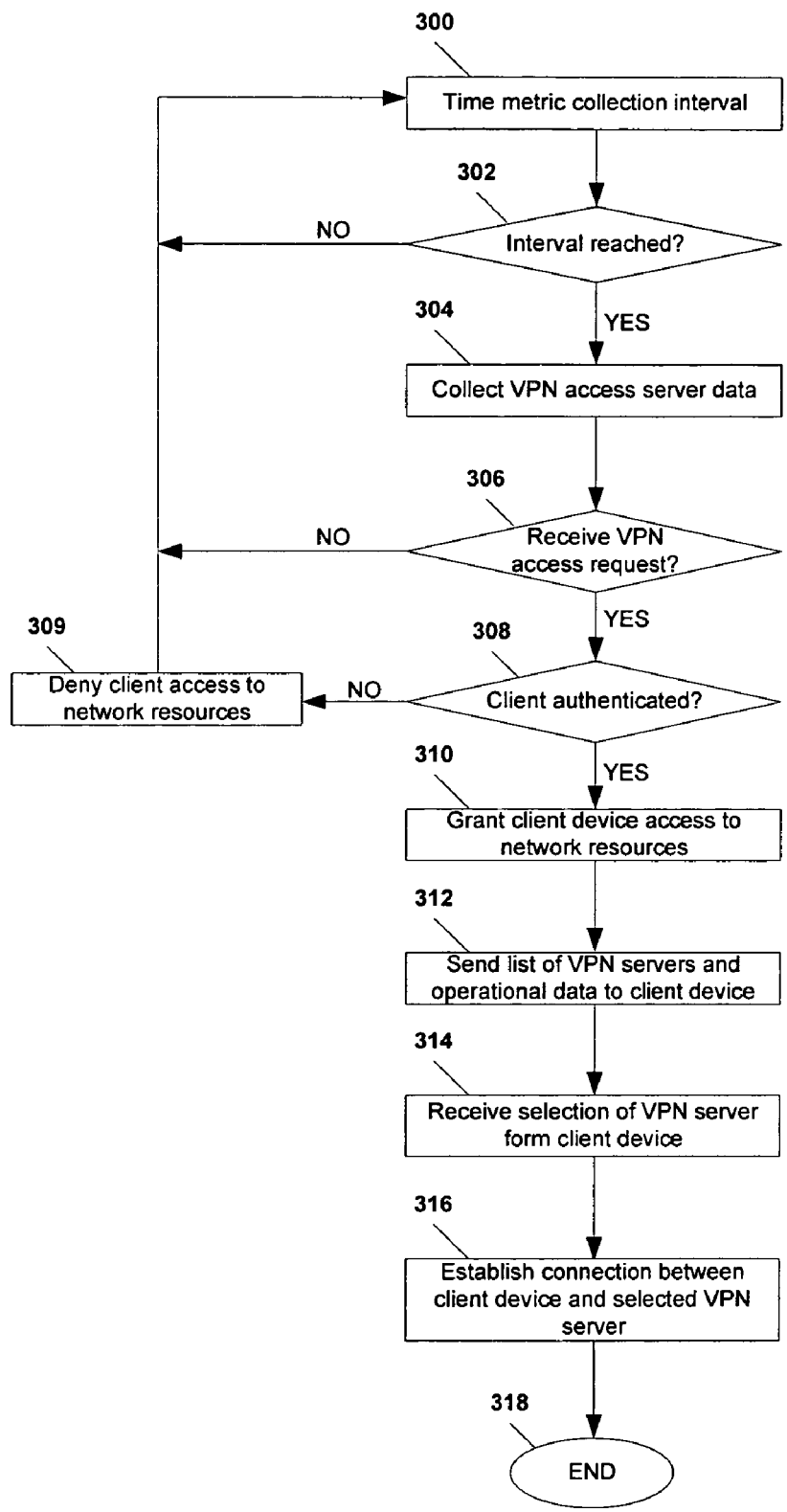
FIG. 3 is a flow diagram of a particular illustrative embodiment of a method of selecting a virtual private network access server.

Referring to FIG. 3, a particular illustrative embodiment of a method of selecting a virtual private network access server is illustrated. At decision step 300, a centralized server that controls access to network resources communicating with a private network times a metric collection interval. Moving to decision step 302, the centralized server determines whether the metric collection interval has been reached. If the centralized server determines that metric collection interval has not been reached, the method returns to block 300. On the other hand, if the centralized server determines that metric collection interval has been reached, the method moves to block 304, and the centralized server collects data related to each of a plurality of VPN access servers. In one embodiment, the centralized server can measure various functions of the VPN access servers when a time interval is reached. Alternatively, another server can measure the functions of the VPN access servers, and the centralized server can collect the corresponding data from the other server when the time interval is reached.

Proceeding to decision step 306, the centralized server determines whether it has received a request from a client device to access network resources via a virtual private network (VPN) connection. If the centralized server determines that it has not received such a request, the method returns to block 300 and continues. Conversely, if the centralized server determines that it has received a request to communicate with network resources via a VPN connection, the method advances to decision step 308. At decision step 308, in an illustrative embodiment, the centralized server determines whether the client device is properly authenticated. For example, the centralized server can send a prompt to the client device for an authentication token. If the centralized server determines that it has not received the authentication token, the method can move to block 309, and the centralized server can deny access to the network resources by the client device. The method can then return to block 300. Whereas, if the centralized server determines that it has received the authentication token, the method can proceed to block 310, and the centralized server can grant the client device access to the network resources via a VPN connection.

Moving to block 312, in a particular embodiment, the centralized server can send a list of available VPN access servers to the client device, along with operational data related to each of the VPN access servers. The centralized server can generate the operational data based on the data collected at block 304. Alternatively, the centralized server can receive the operational data from another server that measures the functions of the VPN access servers. Continuing to block 314, the centralized server receives a selection of one of the VPN access servers from the client device. For example, a user can select one of the listed-VPN access servers based on the operational data. Alternatively, a remote access client application running on the client device can select one of the listed VPN access servers based on the operational data and a user profile or user-selected priorities for selecting a VPN access server.

Proceeding to block 316, in an illustrative embodiment, the centralized server can communicatively connect the client device with the selected VPN access server. The client device can communicate with network resources via the selected VPN access server. The method terminates at 318.

Figure 4:
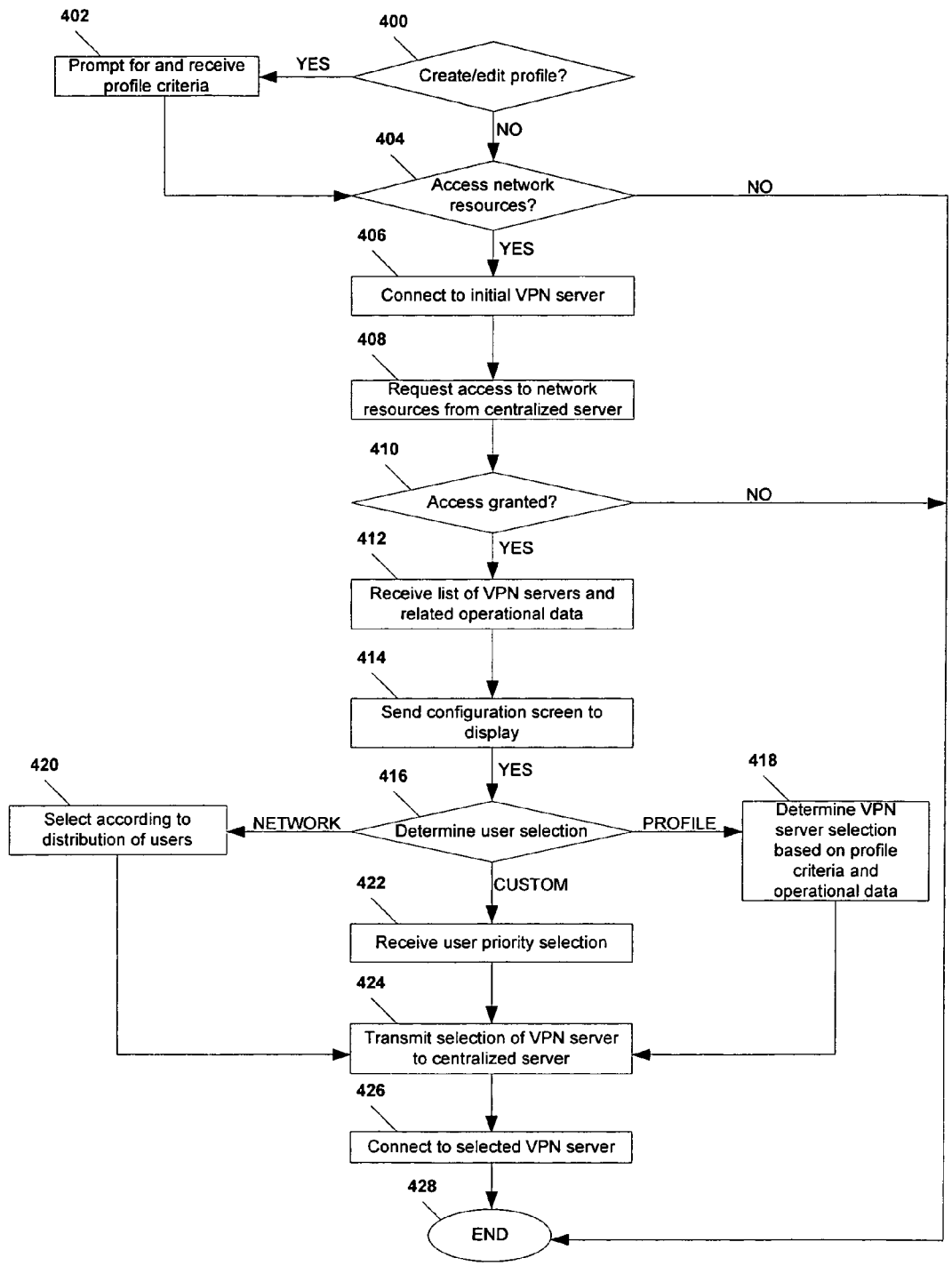
FIG. 4 is a flow diagram of a second particular illustrative embodiment of a method of selecting a virtual private network access server.

Referring to FIG. 4, a second particular illustrative embodiment of a method of selecting a virtual private network (VPN) access server is illustrated. At decision step 400, a client device determines whether it has received a command or selection from a user to create or edit a profile that includes criteria to determine a selection of an available VPN access server based on operational data related to functions of a plurality of VPN access servers. For example, a user can operate a remote access client application at the client device and can input a selection to create or update such a profile. If the client device determines that it has not received a command or selection to create or edit a profile, the method proceeds to decision step 404.

On the other hand, if the client device determines that it has received a command or selection to create or edit a profile, the method moves to block 402. At block 402, the client device prompts the user to input profile criteria, and the client device receives the criteria from the user. The method then proceeds to decision step 404. Profile criteria can indicate, for instance, that CPU utilization related to a VPN access server must be equal to or less than a threshold value, that a number of users of a VPN access server must be equal to or less than a threshold value, that bandwidth available to a VPN access server for various classes of server (e.g., VoIP, data, video, etc.) must be equal to or above a threshold value, other criteria to select a VPN access server, or any combination thereof.

Proceeding to decision step 404, the client device determines whether it has received a selection or command to request access to network resources communicating with a private network via a VPN connection. If the client device determines that it has not received such a selection or command, the method terminates at 428. Conversely, if the client device determines that it has received a selection or command to request access to network resources communicating with a private network via a VPN connection, the method continues to block 406.

At block 406, in a particular embodiment, the client device communicatively connects with an initial one of a plurality of VPN access servers that facilitate communication with network resources communicating with the private network.

Advancing to block 408, the client device sends a request to communicate with the network resources to a centralized server via the initial VPN access server. Moving to decision step 410, the client device can determine whether the centralized server has granted the client device access to the network resources. If the client device is not granted access, for example, where the client device cannot be authenticated, the method terminates at 428. Whereas, if the client device is granted access, the method proceeds to block 412, and the client device receives operational data related to the functions of a plurality of VPN access servers that facilitate communication between client devices and network resources communicating with the private network. In one embodiment, the client device can display a list of available VPN access servers and operational data related to each.

Continuing to block 414, in an illustrative embodiment, the client device can send a graphical user interface (GUI), such as a configuration screen, to a display portion of the client device or to a display device coupled to the client device. In a particular embodiment, the GUI can include options to select a VPN access server according to a user profile, according to priorities designated by the user via the GUI, according to a network-level preference (e.g., evenly distributing users among the VPN access servers), or any combination thereof. The GUI can be generated by a client application running at the client device, or it can be received at the client device from the centralized server. An example of a GUI to select a manner in which a VPN access server is to be selected is illustrated in FIG. 5.

Proceeding to decision step 416, the client device can determine a selection made by a user via the GUI. If the client device determines that the user has selected an option to select a VPN access server according to a user profile, the method moves to block 418, and the client device determines a selected VPN access server from the available VPN access servers based on the profile criteria and operational data related to each of the available VPN access servers. The method then proceeds to block 424.

Returning to decision step 416, in an illustrative embodiment, if the client device determines that the user has selected an option to select a VPN access server according to a network preference, the method moves to block 420, and the client device can determine a selected VPN access server from the available VPN access servers based on network criteria, such as load-balancing among available VPN access servers. The method then proceeds to block 424.

Returning to decision step 416, if the client device determines that the user has selected an option to customize priorities for selecting a VPN access server, the method moves to block 422, and the client device can prompt the user to input one or more VPN access server characteristics that are to be used to select a VPN access server. For example, a user can indicate that CPU utilization is a highest priority, and the client device can select a VPN access server having a lowest CPU utilization. The method then proceeds to block 424.

Proceeding to block 424, the client device sends the selection of the chosen VPN access server to the centralized server. At block 426, the client device communicatively connects with the selected VPN access server, which may be a different one of the available VPN access servers than the initial VPN access server. The method terminates at 428.

In a particular embodiment, the steps of the methods described herein can be executed in the order shown by the figures. In alternative embodiments, some steps can be executed simultaneously or in alternative sequences.

Referring to FIG. 5, a particular illustrative embodiment of a graphical user interface (GUI) 500 to select a VPN access server is illustrated. The GUI 500 includes a plurality of selectable indicators 502-506, each of which corresponds to an option for selecting a VPN access server based on operational data associated with each of a plurality of VPN access servers.

For example, the GUI 500 can include a first selectable indicator 502 that corresponds to an option to select a VPN access server according to a user profile that includes criteria to select a VPN access server from a plurality of VPN access servers based on operational data associated with each of the plurality of VPN access servers. Further, the GUI 500 can include a second selectable indicator 504 that corresponds to an option to select a VPN access server based on user-selected priorities. In addition, the GUI 500 can include a third selectable indicator 506 that corresponds to an option to select a VPN access server based on network preferences.

In an illustrative, non-limiting embodiment, if a user selects an indicator 504 to select a VPN access server based on user-selected priorities, a priority selection region 508 can be displayed within the GUI 500, or via a separate GUI, that includes a plurality of indicators 510 corresponding to VPN access server characteristics. A user can select one or more of the indicators 510 to indicate criteria for selecting a VPN access server based on operational data associated with each of a plurality of VPN access servers. For example, a user can select an indicator 510 corresponding to available bandwidth, indicating that available bandwidth into a private network is to be used as a criterion to select a VPN access server.

In conjunction with the configuration of structure described herein, the system and method disclosed provide a user of a virtual private network (VPN) the ability to select a virtual private network access server, based on data related to functions of each of a plurality of available VPN access servers. In a particular illustrative embodiment, a centralized server that communicates with a private network can collect data related to the functions of each of the VPN access servers. The centralized server can measure various data related to each of the VPN access servers at pre-determined time intervals, or the centralized server can collect the data from another server communicating with the private network at each such time interval. In a particular embodiment, the centralized server can analyze the data and produce operational data related to the functions of each of the VPN access servers.

In an illustrative embodiment, a user of a client device, such as a computing device, can establish VPN communication with one or more network resources communicating with the private network. For example, the client device can send a request to establish VPN communication to the centralized server. In a particular embodiment, such a request can be received at one of the VPN access servers via a public network, such as the Internet. The initial VPN access server can relay or otherwise send the request to the centralized server via the private network without allowing the client device access to the private network until the client device or a user of the client device is authenticated. In an exemplary embodiment, after a required authentication token is received at the centralized server, the client device can be granted VPN access to network resources communicating with the private network.

After the client device is granted access to network resources, the centralized server can send to the client device data related to identifications of a plurality of available VPN access servers and operational data related to each of the VPN access servers. In an illustrative embodiment, the remote access client application can cause the client device to display a list of available VPN access servers with operational data related to functions of each VPN access server.

In a particular embodiment, the user can select one of the plurality of available VPN access servers based on the operational data. In another particular embodiment, the user can instruct the client device, or a remote access client running thereon, to select a VPN access server according to a user profile, user-selected priorities, or network preferences. The client device can send a selection of a VPN access server to the centralized server via the initial VPN access server. The centralized server can communicatively connect the client device with the selected VPN access server, and the user can access network resources.

In another particular embodiment, a user can create and edit a profile at the client device. The profile can include criteria to determine a selection of an available VPN access server based on operational data related to a plurality of VPN access servers. For example, the profile can include criteria that indicate that CPU utilization related to a VPN access server must be equal to or less than a threshold value, that a number of users of a VPN access server must be equal to or less than a threshold value, that available bandwidth must be equal to or above a threshold value, other criteria to select a VPN access server, or any combination thereof. In an illustrative embodiment, the client device can select a VPN access server based on the profile criteria and the operational data received from the centralized server and can send the selection to the centralized server, recommend a VPN access server to the user for selection, or any combination thereof.

In another embodiment, the client device can store multiple user profiles, where each profile includes criteria related to a particular class of service. For instance, a first user profile can include criteria for selecting a VPN access server when a user is using a Voice-over Internet Protocol (VoIP) service, such as criteria that indicate that latency or jitter in reaching upstream resources must be equal to or less than a threshold value. A second user profile can include criteria for selecting a VPN access server when a user is using a video conferencing services, such as criteria that data packet loss must be equal to or less than a threshold value.

Figure 6:
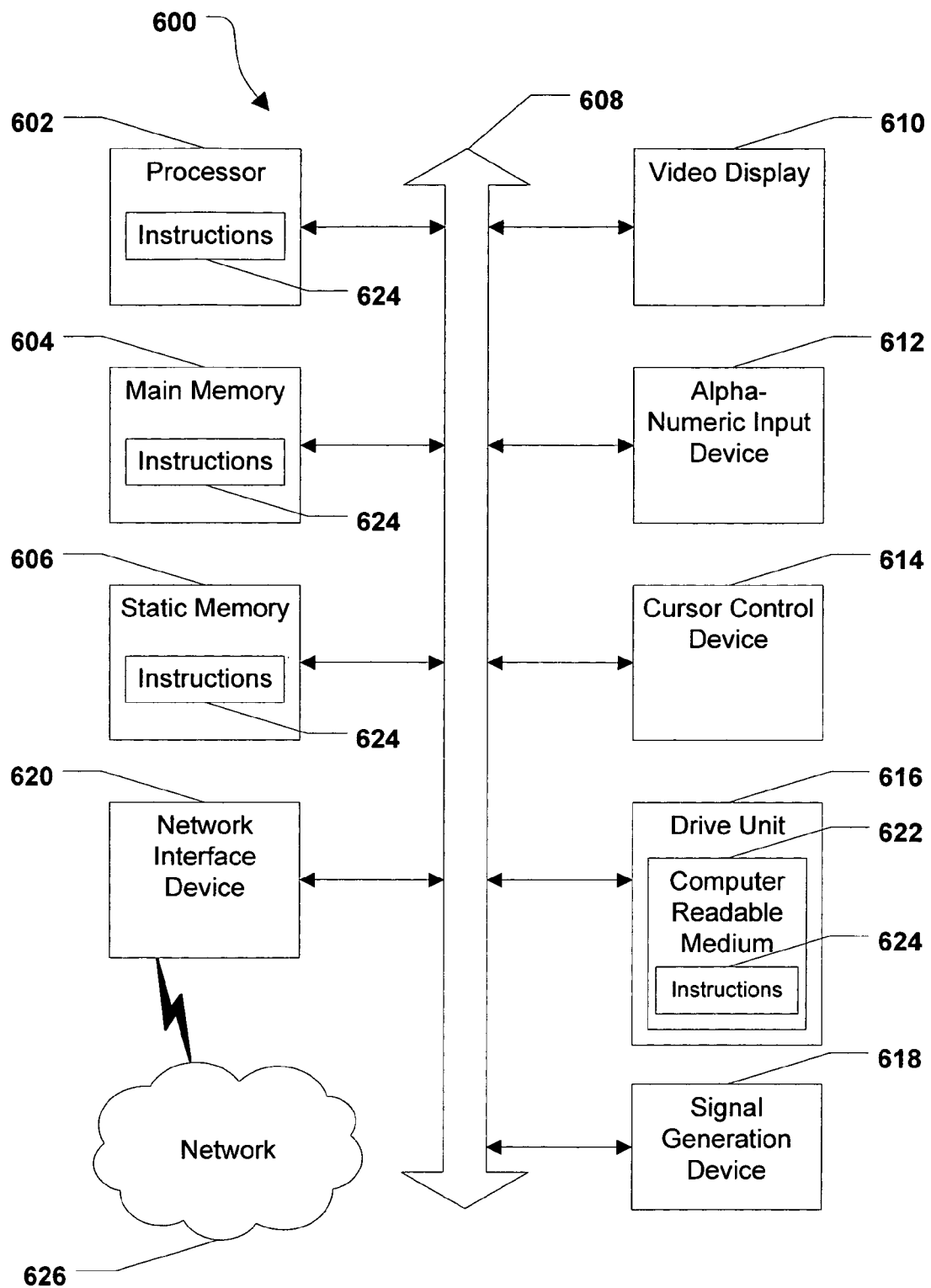
FIG. 6 is a diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices, including a server or client device, as shown in FIGS. 1-2.

In a networked deployment, the computer system may operate in the capacity of a VPN access server, a centralized server, a data collection server, or a client device. The computer system 600 can also be implemented as or incorporated into various devices, such as a personal computer (PC), a tablet PC, a personal digital assistant (PDA), a mobile device, a palmtop computer, a laptop computer, a desktop computer, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. Further, the computer system 600 can include a wireless input device 615, e.g., a remote control device. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. Accordingly, the disclosure is considered to include a tangible storage medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of selecting a virtual private network access server, the method comprising:
   receiving a request from a client device to access a network resource of a private network via a virtual private network (VPN);
   determining a number of client devices communicatively connected to each VPN access server of a plurality of VPN access servers;
   determining a preferred VPN access server of the plurality of VPN access servers based on the number of client devices communicatively connected to each VPN access server and based on a load balancing preference to evenly distribute users among the plurality of VPN access servers;
   sending a list of the plurality of VPN access servers and operational data related to each of the plurality of VPN access servers to the client device, wherein the list of the plurality of VPN access servers includes an indication of the preferred VPN access server, wherein the operational data related to each VPN access server includes at least geographical information related to the VPN access server, proximity of the VPN access server to the client device, and proximity of the VPN access server to the network resource;
   receiving a selection of one of the plurality of VPN access servers from the client device;
   determining an encryption level based on the selection, wherein the encryption level corresponds to a geographic location of the selected one of the plurality of VPN access servers; and
   communicatively connecting the client device with the selected one of the plurality of VPN access servers.

2. The method of claim 1, further comprising:
   collecting data related to each of the plurality of VPN access servers at a time interval;

generating statistics related to each of the plurality of VPN access servers based on the collected data; and wherein the operational data includes the statistics.

3. The method of claim 1, further comprising:

receiving data related to each of the plurality of VPN access servers from a data collection server;

generating statistics related to each of the plurality of VPN access servers based on the collected data; and wherein the operational data includes the statistics.

4. The method of claim 3, wherein the data collection server is an authentication-authorization-accounting (AAA) server.

5. The method of claim 1, wherein the operational data related to each VPN access server further includes an uptime of the VPN access server, a number of current users of the VPN access server, a proportion of a capacity of a processor of the VPN access server being used, a reliability of the VPN access server, an available bandwidth of the VPN access server with respect to the private network, latency in reaching upstream resources via the VPN access server, jitter in reaching upstream resources via the VPN access server, or any combination thereof.

6. The method of claim 1, further comprising authenticating the client device before sending the list of the plurality of VPN access servers and the operational data to the client device.

7. A method of selecting a virtual private network access server, the method comprising:

sending, from a client device, a request to a centralized server to receive access to a network resource of a private network via a virtual private network (VPN), wherein the request is associated with a particular class of VPN service of a plurality of classes of VPN services;

receiving, at the client device, from the centralized server, a list of a plurality of VPN access servers and operational data related to each of the plurality of VPN access servers, wherein the operational data related to each VPN access server includes at least geographical information related to the VPN access server, proximity of the VPN access server to the client device, and proximity of the VPN access server to the network resource;

selecting, at the client device, a profile associated with the particular class of VPN service, wherein the selected profile includes performance criteria related to the particular class of VPN service;

selecting, at the client device, one of the plurality of VPN servers based on the operational data and based on the performance criteria related to the particular class of VPN service;

determining an encryption level based on the selection, wherein the encryption level corresponds to a geographic location of the selected one of the plurality of VPN access servers; and sending, from the client device, a selection of the selected one of the plurality of VPN access servers to the centralized server.

8. The method of claim 7, further comprising communicating with the network resource via the selected one of the plurality of VPN access servers.

9. The method of claim 7, further comprising:

communicating with a first of the plurality of the VPN access servers after sending the request to receive access to the network resource; and communicating with the network resource via a second of the plurality of the VPN access servers, wherein the selected one of the plurality of VPN access servers is the second of the plurality of VPN access servers.

10. The method of claim 7, wherein the particular class of VPN service includes a Voice over Internet Protocol (VoIP) service, wherein the operational data related to each VPN access server further includes latency in reaching upstream resources via the VPN access server, and wherein the performance criteria related to the VoIP service indicate a threshold value with respect to latency in reaching upstream resources.

11. The method of claim 7, wherein the particular class of VPN service includes a Voice over Internet Protocol (VoIP) service, wherein the operational data related to each VPN access server further includes jitter in reaching upstream resources via the VPN access server, and wherein the performance criteria related to the VoIP service indicate a threshold value with respect to jitter in reaching upstream resources.

12. The method of claim 7, wherein the particular class of VPN service includes a video conferencing service, wherein the operational data related to each VPN access server further includes packet loss, and wherein the performance criteria related to the video conferencing service indicate a threshold value with respect to packet loss.

13. A system, comprising:

a centralized server communicating with a private network, the centralized server having a processor and a memory device accessible to the processor;

wherein the memory device includes instructions to communicate with a client device to receive a request to access a network resource via a virtual private network (VPN), the network resource communicating with the private network;

wherein the memory device includes instructions to determine a number of client devices communicatively connected to each VPN access server of a plurality of VPN access servers;

wherein the memory device includes instructions to determine a preferred VPN access server of the plurality of VPN access servers based on the number of client devices communicatively connected to each VPN access server and based on a load balancing preference to evenly distribute users among the plurality of VPN access servers;

wherein the memory device includes instructions to send a list of the plurality of VPN access servers to the client device and to send operational data related to each of the plurality of VPN access servers to the client device, wherein the operational data related to each VPN access server includes at least geographical information related to the VPN access server, proximity of the VPN access server to the client device, and proximity of the VPN access server to the network resource, and wherein the list of the plurality of VPN access servers includes an indication of the preferred VPN access server; and wherein the memory device includes instructions to communicate with the client device to receive a selection of one of the plurality of VPN access servers from the client device, wherein an encryption level is determined based on the selection, and wherein the encryption level corresponds to a geographic location of the selected one of the plurality of VPN access servers.

14. The system of claim 13, wherein the memory device includes instructions to communicatively connect the client device and the selected one of the plurality of VPN access servers.

15. The system of claim 13, wherein the centralized server sends the operational data to the client device via a first of the plurality of VPN access servers.

16. The system of claim 15, wherein the memory device includes instructions to communicatively connect the client device with a second of the plurality of VPN access servers, when the selected one of the plurality of VPN access servers is the second of the plurality of VPN access servers.

17. A system, comprising:
a client device having a processor and a memory device accessible to the processor;
wherein the memory device includes instructions to communicate with a centralized server of a private network to request access to a network resource of the private network via a virtual private network (VPN), wherein the request is associated with a particular class of VPN service of a plurality of classes of VPN services;
wherein the memory device includes instructions to communicate with the centralized server to receive a list of a plurality of VPN access servers and to receive operational data related to each of the plurality of VPN access servers, and wherein the operational data related to each VPN access server includes at least geographical information related to the VPN access server, proximity of the VPN access server to the client device, and proximity of the VPN access server to the network resource;
wherein the memory device includes instructions to select a profile associated with the particular class of VPN service, wherein the selected profile includes performance criteria related to the particular class of VPN service;
wherein the memory device includes instructions to select one of the plurality of VPN servers based on the operational data and based on the performance criteria related to the particular class of VPN service;
wherein the memory device includes instructions to determine an encryption level that corresponds to a geographic location of the selected one of the plurality of VPN access servers; and
wherein the memory device includes instructions to send a selection of the selected one of the plurality of VPN access servers to the centralized server.

18. The system of claim 17, wherein the memory device includes instructions to communicate with the network resource via the selected one of the plurality of VPN access servers.

19. The system of claim 18, wherein the performance criteria include a threshold value of operational data, a required value of operational data, a maximum value of operational data, or any combination thereof.

20. The system of claim 17, wherein the particular class of VPN service includes a Voice over Internet Protocol (VoIP) service, wherein the operational data related to each VPN access server further includes latency in reaching upstream resources via the VPN access server, and wherein the performance criteria related to the VoIP service indicate a threshold value with respect to latency in reaching upstream resources.

21. The system of claim 17, wherein the particular class of VPN service includes a Voice over Internet Protocol (VoIP) service, wherein the operational data related to each VPN access server further includes jitter in reaching upstream resources via the VPN access server, and wherein the performance criteria related to the VoIP service indicate a threshold value with respect to jitter in reaching upstream resources.

22. The system of claim 17, wherein the particular class of VPN service includes a video conferencing service, wherein the operational data related to each VPN access server further includes packet loss, and wherein the performance criteria related to the video conferencing service indicate a threshold value with respect to packet loss.

23. A non-transitory computer-readable tangible medium embodying computer-executable instructions, the computer-executable instructions comprising:
instructions to request access to a network resource of a private network via a virtual private network (VPN), wherein the request is associated with a particular class of VPN service of a plurality of classes of VPN services;
instructions to communicate with a centralized server of the private network to receive, at a client device, a list of a plurality of VPN access servers and to receive operational data related to each of the plurality of VPN access servers, wherein the operational data related to each VPN access server includes at least geographical information related to the VPN access server, proximity of the VPN access server to the client device, and proximity of the VPN access server to the network resource;
instructions to select a profile associated with the particular class of VPN service, wherein the selected profile includes performance criteria related to the particular class of VPN service;
instructions to select one of the plurality of VPN servers based on the operational data and based on the performance criteria related to the particular class of VPN service;
instructions to determine an encryption level that corresponds to a geographic location of the selected one of the plurality of VPN access servers; and
instructions to send a selection of the selected one of the plurality of VPN access servers from the client device to the centralized server.

24. The non-transitory computer-readable tangible medium of claim 23, further comprising:
instructions to communicate with a first of the plurality of the VPN access servers after sending the request to receive access to the network resource; and
instructions to communicate with the network resource via a second of the plurality of the VPN access servers, wherein the selected one of the VPN access servers is the second of the plurality of VPN access servers.

25. The non-transitory computer-readable tangible medium of claim 23, further comprising a remote access client application.

26. The non-transitory computer-readable tangible medium of claim 23, wherein the particular class of VPN service includes a Voice over Internet Protocol (VoIP) service, wherein the operational data related to each VPN access server further includes at least one of latency and jitter in reaching upstream resources via the VPN access server, and wherein the performance criteria related to the VoIP service indicate a threshold value with respect to latency or jitter in reaching upstream resources.

27. The non-transitory computer-readable tangible medium of claim 23, wherein the particular class of VPN service includes a video conferencing service, wherein the operational data related to each VPN access server further includes packet loss, and wherein the performance criteria related to the video conferencing service indicate a threshold value with respect to packet loss.

* * * * *